United States Patent
Han et al.

(10) Patent No.: US 12,278,378 B2
(45) Date of Patent: Apr. 15, 2025

(54) NEGATIVE ELECTRODE CURRENT COLLECTOR FOR LITHIUM METAL BATTERY, SECONDARY BATTERY INCLUDING THE SAME, AND METHOD FOR MANUFACTURING NEGATIVE ELECTRODE CURRENT COLLECTOR FOR LITHIUM METAL BATTERY

(71) Applicants: LG CHEM, LTD., Seoul (KR); KOREA ADVANCED INSTITUTE OF SCIENCE AND TECHNOLOGY, Daejeon (KR)

(72) Inventors: Hyung Seok Han, Daejeon (KR); Hyung Kyun Yu, Daejeon (KR); Jae Won Moon, Daejeon (KR); Hee Tak Kim, Daejeon (KR); Yun Jung Kim, Daejeon (KR)

(73) Assignees: LG ENERGY SOLUTION, LTD., Seoul (KR); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 329 days.

(21) Appl. No.: 16/954,803

(22) PCT Filed: Feb. 13, 2019

(86) PCT No.: PCT/KR2019/001783
§ 371 (c)(1),
(2) Date: Jun. 17, 2020

(87) PCT Pub. No.: WO2019/160338
PCT Pub. Date: Aug. 22, 2019

(65) Prior Publication Data
US 2021/0098794 A1    Apr. 1, 2021

(30) Foreign Application Priority Data
Feb. 13, 2018  (KR) .................. 10-2018-0017720

(51) Int. Cl.
H01M 4/66    (2006.01)
H01M 4/02    (2006.01)
(Continued)

(52) U.S. Cl.
CPC ......... H01M 4/661 (2013.01); H01M 4/0404 (2013.01); H01M 4/0471 (2013.01);
(Continued)

(58) Field of Classification Search
CPC ........... H01M 2004/027; H01M 4/131; H01M 4/134; H01M 4/661; H01M 4/669; H01M 10/052
See application file for complete search history.

(56) References Cited

U.S. PATENT DOCUMENTS 8,221,897 B2   7/2012  Muroga et al.
10,050,277 B2  8/2018  Shinozaki et al.
(Continued)

FOREIGN PATENT DOCUMENTS

CN   101183714 A   5/2008
CN   101384845 A   2/2009
(Continued)

OTHER PUBLICATIONS

Machine Translation of Hiroshi (Year: 2014).*
(Continued)

*Primary Examiner* — Matthew T Martin
*Assistant Examiner* — Ankith R Sripathi
(74) *Attorney, Agent, or Firm* — Birch, Stewart, Kolasch & Birch, LLP

(57) ABSTRACT

A negative electrode current collector for a lithium metal battery, including copper and having a sum of S(110) and S(100) of 50% or more, wherein the S(110) is a ratio of a region occupied by a (110) surface of copper based on an entire region occupied by copper at a surface of the negative (Continued)

electrode current collector, and the S(100) is a ratio of a region occupied by a (100) surface of copper based on an entire region occupied by copper at a surface of the negative electrode current collector.

6 Claims, 7 Drawing Sheets

(51) Int. Cl.
*H01M 4/04* (2006.01)
*H01M 4/131* (2010.01)
*H01M 4/134* (2010.01)
*H01M 4/1391* (2010.01)
*H01M 4/1395* (2010.01)
*H01M 10/0525* (2010.01)

(52) U.S. Cl.
CPC ........... *H01M 4/131* (2013.01); *H01M 4/134* (2013.01); *H01M 4/1391* (2013.01); *H01M 4/1395* (2013.01); *H01M 10/0525* (2013.01); *H01M 2004/027* (2013.01)

(56) References Cited

U.S. PATENT DOCUMENTS

| | | | |
|---|---|---|---|
| 2004/0072079 | A1 | 4/2004 | Hashimoto et al. |
| 2007/0111103 | A1 | 5/2007 | Konishiike et al. |
| 2009/0017325 | A1 | 1/2009 | Muroga et al. |
| 2009/0061326 | A1 | 3/2009 | Hirose et al. |
| 2015/0030909 | A1* | 1/2015 | Ihlefeld ............. H01M 10/0562 429/162 |
| 2015/0037689 | A1* | 2/2015 | Nishimura ............ H01M 4/502 429/231.95 |
| 2015/0267313 | A1 | 8/2015 | Chou et al. |
| 2016/0013493 | A1 | 1/2016 | Shinozaki et al. |
| 2016/0260980 | A1 | 9/2016 | Lee et al. |
| 2016/0285077 | A1* | 9/2016 | Miki ........................ C22C 13/00 |
| 2019/0067702 | A1 | 2/2019 | Son et al. |
| 2019/0207205 | A1* | 7/2019 | Adair .................. H01M 4/0483 |
| 2019/0207218 | A1* | 7/2019 | Zheng .................... C23C 18/405 |

FOREIGN PATENT DOCUMENTS

| | | | |
|---|---|---|---|
| CN | 104583481 A | | 4/2015 |
| CN | 104716330 A | | 6/2015 |
| CN | 104928726 A | | 9/2015 |
| JP | 2003-142106 A | | 5/2003 |
| JP | 2005-135856 A | | 5/2005 |
| JP | 2009-19232 A | | 1/2009 |
| JP | 2009-26491 A | | 2/2009 |
| JP | 2010-114093 A | | 5/2010 |
| JP | 2012-129136 A | | 7/2012 |
| JP | 2013-241662 A | | 12/2013 |
| JP | 2015-17300 A | | 1/2015 |
| KR | 10-2014-0039951 A | | 4/2014 |
| KR | 10-2014-0057584 A | | 5/2014 |
| KR | 10-2015-0034743 A | | 4/2015 |
| KR | 10-1518050 B1 | | 5/2015 |
| KR | 10-2015-0126195 A | | 11/2015 |
| KR | 10-2017-0088614 A | | 8/2017 |
| KR | 10-2018-0007798 A | | 1/2018 |
| WO | WO 2013/021969 A1 | | 2/2013 |
| WO | WO 2014/002996 A1 | | 1/2014 |

OTHER PUBLICATIONS

Chen et al., "Faceted $Cu_2O$ structures with enhancing Li-ion battery anode performances", CrystEngComm, 17, 2015, pp. 2110-2117.
International Search Report issued in PCT/KR2019/001783 (PCT/ISA/210), dated May 23, 2019.
European Search Report mailed Feb. 24, 2021 for EP Application No. 19754158.4.

* cited by examiner

NEGATIVE ELECTRODE CURRENT COLLECTOR FOR LITHIUM METAL BATTERY, SECONDARY BATTERY INCLUDING THE SAME, AND METHOD FOR MANUFACTURING NEGATIVE ELECTRODE CURRENT COLLECTOR FOR LITHIUM METAL BATTERY

CROSS-REFERENCE TO RELATED APPLICATIONS

This application claims the benefit of Korean Patent Application No. 10-2018-0017720, filed on Feb. 13, 2018, in the Korean Intellectual Property Office, the disclosure of which is incorporated herein in its entirety by reference.

TECHNICAL FIELD

The present invention relates to a negative electrode current collector for a lithium metal battery, in which the sum of S(110) and S(100) is 50% or more, a battery including the same, and a method for manufacturing the negative electrode current collector, wherein the S(110) is the ratio of a region occupied by the (110) surface of copper based on the entire region occupied by copper at the surface of the negative electrode current collector, and the S(100) is the ratio of a region occupied by the (100) surface of copper based on the entire region occupied by copper at the surface of the negative electrode current collector.

BACKGROUND ART

Demand on the use of alternative energy or clean energy has been increased as the use of fossil fuel is significantly increased, and the most actively studied field as a part is the generation and accumulation field using electrochemical reaction.

Recently, as a typical electrochemical device using such electrochemical energy may be a secondary battery, and its application usage is gradually increasing. Demand for secondary batteries as an energy source has been significantly increased as technology development and demand with respect to mobile devices such as a portable computer, a portable cellular phone, and camera have increased, the demand for secondary batteries as an energy source is rapidly increasing, and among these secondary batteries, study on lithium secondary batteries has been conducted and lithium secondary batteries have been commercialized and used.

Recently, in order to accomplish high energy density, development of lithium metal batteries among the lithium secondary batteries has been conducted. The lithium metal battery is characterized in using a lithium metal as a negative electrode. In order to increase the energy density per volume or per weight of such lithium metal batteries, the amount used of a lithium metal used in a negative electrode is required to decrease to a suitable level or less. For that, technique of disposing a lithium metal on a negative electrode current collector during driving for activating a battery using a negative electrode current collector may be used.

Meanwhile, in case of disposing a lithium metal on a negative electrode current collector, the lithium metal may be nonuniformly disposed, dendrite of a resin phase may be produced by the lithium metal, or the lithium metal reacts with an electrolyte and remaining water due to the high reactivity of the lithium metal to form a solid electrolyte interphase (SEI) on the surface of the negative electrode. This phenomenon is accelerated in case where the nucleation of lithium does not proceed smoothly. Since the dendrite of a resin phase forms an inert lithium which could not make electrical contact with a negative electrode current collector during discharging a battery, the deterioration of energy density in a negative electrode is induced. In addition, due to the dendrite with a resin phase, the surface area of the negative electrode may consistently increase and the increase and accumulation of the solid electrolyte interphase may arise. Accordingly, the lithium metal and the electrolyte may be consistently consumed, and due to this phenomenon, the efficiency and cycle properties of the lithium metal battery may be degraded. Further, a separator may be broken due to the dendrite with a resin phase, and accordingly, battery stability may be significantly degraded including the explosion of a battery.

Therefore, in order to improve the efficiency, cycle properties and stability of a lithium metal battery, development of a negative electrode current collector by which the nucleation of lithium may be easily performed on the surface of the current collector, is required.

DISCLOSURE OF THE INVENTION

Technical Problem

An aspect of the present invention provides a negative electrode current collector by which the nucleation of lithium on the surface thereof may be easily performed, a lithium metal battery including the same, and a method for manufacturing the negative electrode current collector.

Technical Solution

According to an embodiment of the present invention, there is provided a negative electrode current collector for a lithium metal battery, including copper and wherein in said negative electrode current collector, a sum of S(110) and S(100) of 50% or more, wherein the S(110) is a ratio of a region occupied by a (110) surface of copper based on an entire region occupied by copper at a surface of the negative electrode current collector, and the S(100) is a ratio of a region occupied by a (100) surface of copper based on an entire region occupied by copper at a surface of the negative electrode current collector.

According to another embodiment of the present invention, there is provided a method for manufacturing a negative electrode current collector for a lithium metal battery, including a step of preparing a preliminary negative electrode current collector including copper; and a step of heat treating the preliminary negative electrode current collector in an atmosphere of a gas mixture including hydrogen and argon, wherein at least a portion of a surface of the preliminary negative electrode current collector is made up of the copper.

According to another embodiment of the present invention, there is provided a lithium metal battery including a negative electrode; a positive electrode; a separator disposed between the positive electrode and the negative electrode; and an electrolyte, wherein the negative electrode includes the negative electrode current collector of the above-described embodiment.

Advantageous Effects

According to the present invention, in a negative electrode current collector for a lithium metal battery, since the sum of S(110) and S(100) is 50% or more, the nucleation of lithium at the surface of the negative electrode current collector may be achieved uniformly with high density. Accordingly, a lithium metal may be uniformly formed on the negative electrode current collector, and the formation of a dendrite with a resin phase and a solid electrolyte interphase may be minimized. Accordingly, the efficiency, cycle properties and stability of a lithium metal battery may be improved.

BEST MODE FOR CARRYING OUT THE INVENTION

Figure 1A:
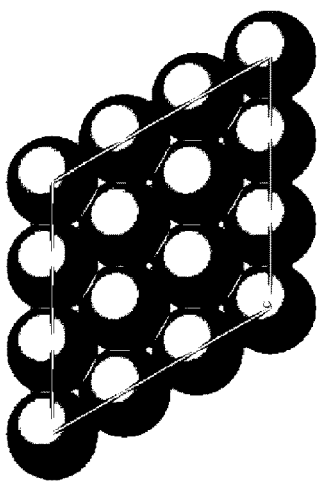
FIG. 1A-FIG. 1C shows voltage graphs with respect to capacity in case where lithium is plated at constant current on copper single crystal composed of a (111) surface, a (100) surface and a (110) surface.
Figure 1A:
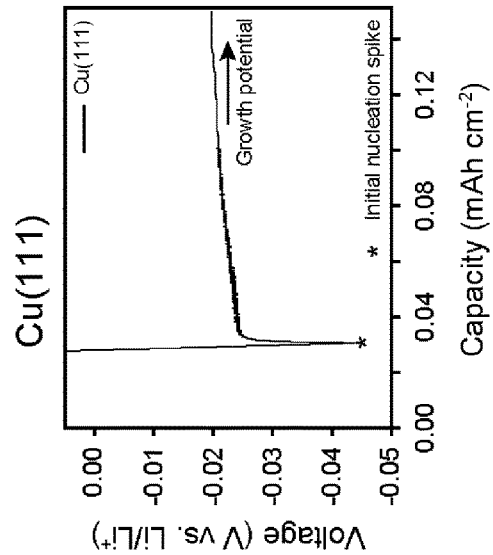

Hereinafter, the present invention will be described in more detail to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The term used herein is for the purpose of describing particular embodiments only and is not intended to be limiting of the invention. The singular forms are intended to include the plural forms as well, unless the context clearly indicates otherwise.

It will be understood that the terms "comprises", "includes" or "has" in this disclosure, specify the presence of stated features, numerals, steps, elements or the combination thereof, but do not preclude the presence or addition of one or more other features, numerals, steps, elements or the combination thereof.

The negative electrode current collector for a lithium metal battery according to an embodiment of the present invention includes copper, and the sum of S(110) and S(100) may be 50% or more. The S(110) is the ratio of a region occupied by a (110) surface of copper based on the entire region occupied by copper at the surface of the negative electrode current collector, and the S(100) is the ratio of a region occupied by a (100) surface of copper based on the entire region occupied by copper at the surface of the negative electrode current collector.

At least a portion of the surface of the negative electrode current collector may be made up of copper. Particularly, the surface of the negative electrode current collector may be made up of copper. The copper may constitute the surface while being exposed to the outside. The copper provides a site where lithium transported from a positive electrode may be electrodeposited during driving a lithium metal battery.

The copper may occupy at least a partial region of the surface of the negative electrode current collector, and particularly, the copper may occupy the entire region of the surface of the negative electrode current collector.

The negative electrode current collector may be made up of copper, and particularly, the negative electrode current collector may be a copper foil. In case where the negative electrode current collector is made up of copper, the manufacture of a negative electrode current collector of a large area may be easy. In addition, the negative electrode current collector made up of copper has excellent electrochemical stability and high electroconductivity in a lithium secondary battery. Accordingly, uniform current distribution may be achieved in a negative electrode, and the accomplishment of a battery of a large area may be very effective. Further, a negative electrode current collector made up of copper has excellent mechanical strength and the generation of cracks and deformation by repeated charge and discharge may be minimized.

Differently, the negative electrode current collector may include a base, and the copper may be coated on the base. Particularly, the copper may cover at least a portion of the surface of the base, and more particularly, the copper may cover the entire surface of the base. In case where the negative electrode current collector is composed of the base and the copper coated on the base, the amount used of the copper may be minimized and the production cost may be saved, and the manufacture of the negative electrode current collector having a thickness of a micrometer (μm) degree may be easy according to a copper coating method.

The base may preferably use a stable material of which physical properties are not easily changed at high temperature. Particularly, the base may be at least one selected from the group consisting of silicon, silicon oxide, gold, stainless steel, aluminum, nickel, titanium and silver.

The thickness of the copper coated on the base may be from 10 nm to 5,000 nm, particularly, from 10 nm to 500 nm. In case where the above-mentioned range is satisfied, in a process for disposing copper on the base, heat treating time may be decreased and thus, a process may be simplified and electroconductivity may be excellent.

In the negative electrode current collector, the sum of S(110) and S(100) may be 50% or more, particularly, 60% or more, more particularly, 60% to 100%. Here, the S(110) is the ratio of a region occupied by a (110) surface of copper based on the entire region occupied by copper at the surface of the negative electrode current collector, and the S(100) is the ratio of a region occupied by a (100) surface of copper based on the entire region occupied by copper at the surface of the negative electrode current collector. That is, the S(110) means the ratio of a region occupied by the (110) surface of copper exposed to the outside based on the entire region occupied by copper exposed to the outside at the surface of the negative electrode current collector, and the S(100) means the ratio of a region occupied by the (100) surface of copper exposed to the outside based on the entire region occupied by copper exposed to the outside at the surface of the negative electrode current collector. The S(110) and S(100) may be measured by an electron backscatter diffraction (EBSD) method.

Figure 1B:
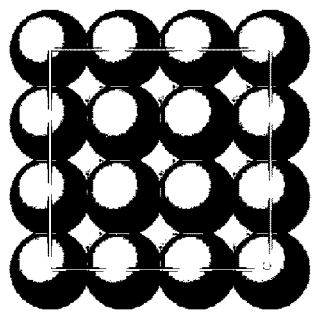
Figure 1B:
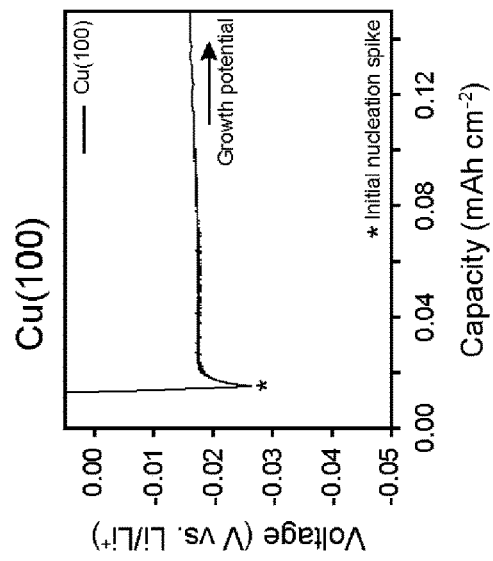
Figure 1C:
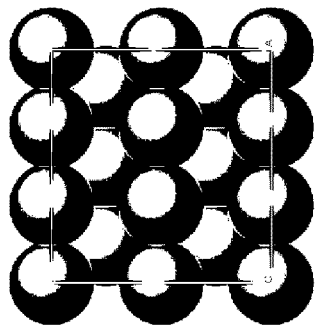
Figure 1C:
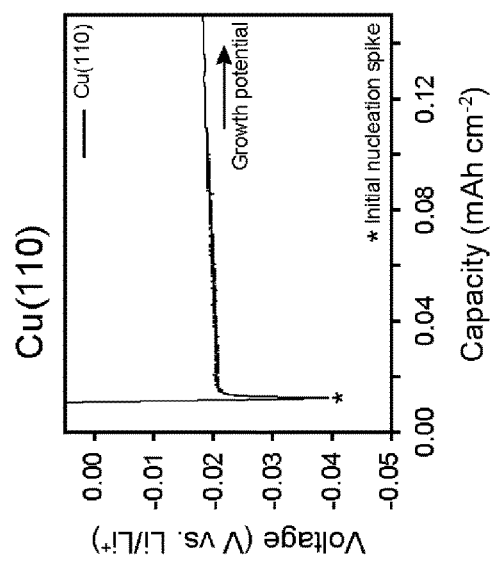

When compared with the (111) surface of copper, the (110) surface and the (100) surface require relatively low energy for lithium nucleation. This may be confirmed through FIG. 1A-FIG. 1C. FIG. 1A-FIG. 1C shows voltage graphs with respect to capacity in case where lithium is plated at constant current on copper single crystal composed of a (111) surface, a (100) surface and a (110) surface. Referring to FIG. 1A-FIG. 1C, it may be found that the absolute value of a voltage for generating initial nucleation is the highest for copper single crystal composed of the (111) surface, and is relatively low for copper single crystal composed of the (110) surface or the (100) surface.

Accordingly, the present invention has technical significance in positioning the (110) surface and (100) surface of copper on the surface of the negative electrode current collector at a desirable level and easily generating lithium nucleation.

Accordingly, in case where the sum of S(110) and S(100) is 50% or more, lithium nucleation may be easily generated on the negative electrode current collector with low energy, and if a lithium metal battery is driven for activation, lithium may be primarily formed on the negative electrode current collector uniformly with high density. Accordingly, the formation of dendrite with a resin phase and a solid electrolyte interphase may be minimized, and the efficiency, cycle properties and stability of a lithium metal battery may be improved. On the contrary, in case where the sum of S(110) and S(100) is less than 50%, lithium of a resin phase may be nonuniformly disposed on a partial area of the surface of the negative electrode current collector, and the life of a battery may decrease.

The ratio of the S(100) and the S(110) may be 100:0 to 5:1, particularly, 20:1 to 15:1. Referring to FIG. 1A-FIG. 1C, the absolute value of a voltage for generating initial nucleation is smaller for copper single crystal composed of the (100) surface, than copper single crystal composed of the (110) surface. However, in case where the S(100) is excessively increased, the manufacturing cost of the negative electrode current collector may be excessively increased.

Preferably, the ratio of the S(100) and the S(110) may be 18:1 to 17:1. In case where the same surface index is present in an excessively large ratio, electrodeposition of lithium at a copper grain boundary is severely interfered when orientating copper, and lithium may be nonuniformly disposed. Accordingly, a case where the ratio of the S(100) and the S(110) satisfies 18:1 to 17:1 is most preferable in consideration of the manufacturing cost and the uniformity of lithium.

The method for manufacturing a negative electrode current collector for a lithium metal battery according to another embodiment of the present invention may include a step of preparing a preliminary negative electrode current collector including copper; and a step of heat treating the preliminary negative electrode current collector in an atmosphere of a gas mixture including hydrogen and argon, wherein at least a portion of a surface of the preliminary negative electrode current collector may be made up of the copper. According to the manufacturing method, the negative electrode current collector for a lithium metal battery according to an embodiment may be manufactured.

The preliminary negative electrode current collector may include copper exposed to the outside. The preliminary negative electrode current collector may be made up of copper. Alternatively, the preliminary negative electrode current collector may include a base, and the copper may be coated on the base. Here, the base is the same as the base in the above-described embodiment, and the explanation thereof will be omitted.

In the preliminary negative electrode current collector, the sum of the S(110) and the S(100) may be less than 50%. The definition of the S(110) and the S(100) is the same as described above.

The step of heat treating may include injecting the preliminary negative electrode current collector into a reactor, increasing the internal temperature of the reactor, and inflowing a gas mixture including hydrogen and argon.

The gas mixture plays the role of forming the main surface index of copper constituting the surface of the negative electrode current collector into a (100) surface, and plays the role of removing a copper oxide layer on the surface of the negative electrode current collector.

The hydrogen may be included in 4 wt % to 40 wt %, particularly 4 wt % to 10 wt % based on the total amount of the gas mixture. In case where the range is satisfied, copper may be oriented so that the surface index of the (100) surface of copper may become dominant effectively in a rapid time with a small amount of hydrogen.

The inflowing rate of the gas mixture may be from 20 sccm to 500 sccm, particularly, from 20 sccm to 100 sccm. In case where the range is satisfied, the surface orientation of copper disposed at the surface of the preliminary negative electrode current collector and exposed to the outside may be controlled uniformly overall.

The heat treating may be performed at 600° C. to 1,000° C., particularly, 800° C. to 1,000° C. In case where the range is satisfied, the ratio of the S(110) and the S(100) may be controlled high and process time may be decreased.

The heat treating may be performed for 0.5 hours to 8 hours, particularly, 0.5 hours to 1 hour. In case where the range is satisfied, the ratio of the S(110) and the S(100) may be controlled to total 50% or more, and thus, the processing time is not long and productivity may be improved.

The negative electrode according to another embodiment of the present invention may include a negative electrode current collector. The negative electrode current collector is the same as the above-described negative electrode current collector of an embodiment, and the explanation thereof will be omitted. The negative electrode may particularly be composed of the negative electrode current collector. In this case, an initial lithium metal may be formed on the negative electrode current collector during driving for activating a lithium metal battery. That is, before supplying initially a power for driving for activating a lithium metal battery, lithium transported from a positive electrode is not formed on the negative electrode current collector, and according to the driving for activation, the negative electrode may become include a lithium metal disposed on the negative electrode current collector.

The lithium metal battery according to another embodiment of the present invention may include a negative electrode; a positive electrode; a separator disposed between the positive electrode and the negative electrode; and an electrolyte. Here, the negative electrode is the same as the negative electrode of the embodiment, and the explanation thereof will be omitted.

The positive electrode may include a positive electrode current collector and a positive electrode active material layer formed on the positive electrode current collector and including a positive electrode active material.

In the positive electrode, any positive electrode current collector may be used so long as it has conductivity as well as not causing chemical changes in the battery, and for example, stainless steel, aluminum, nickel, titanium, fired carbon, or aluminum or stainless steel that is surface-treated with carbon, nickel, titanium, silver, or the like may be used. Also, generally, the positive electrode current collector may have a thickness of 3 to 500 μm, and an uneven surface may be formed on the surface of the current collector to improve the bonding strength of the positive electrode active material. The current collector may be used in various shapes, such as that of a film, a sheet, a foil, a net, a porous body, a foam body, a non-woven fabric body, and the like.

The positive electrode active material may be commonly used positive electrode active materials. Particularly, the positive electrode active material may be a layer compound such as lithium cobalt oxide ($LiCoO_2$) and lithium nickel oxide ($LiNiO_2$); or a compound substituted with one or more transition metals; lithium iron oxides such as $LiFe_3O_4$; lithium manganese oxides such as chemical formulas $Li_{1+c1}Mn_{2-c1}O_4$ ($0 \leq c1 \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxide represented by chemical formula $LiNi_{1-c2}M_{c2}O_2$ (where M is at least one selected from the group consisting of Co, Mn, Al, Cu, Fe, Mg, B, and Ga, and $0.01 \leq c2 \leq 0.3$); lithium manganese complex oxide represented by the chemical formula $LiMn_{2-c3}M_{c3}O_2$ (where M is at least one selected from the group consisting of Co, Ni, Fe, Cr, Zn, and Ta, and $0.01 \leq c3 \leq 0.1$ is satisfied) or $Li_2Mn_3MO_8$ (where M is at least one selected from the group consisting of Fe, Co, Ni, Cu, and Zn); $LiMn_2O_4$ in which a part of Li is substituted with alkaline earth metal ions. However, the positive electrode active material is not limited thereto. The positive electrode may be a Li-metal.

The positive electrode active material layer may include a positive electrode conducting agent and a positive electrode binder together with the positive electrode active material described above.

In this case, the positive electrode conducting agent is used for imparting an electrode with conductivity and any material may be used without particular limitation so long as it has electron conductivity without causing chemical changes in the composed battery. Particular examples may include graphite such as natural graphite and artificial graphite; carbon materials such as carbon black, acetylene black, Ketjen black, channel black, furnace black, lamp black, thermal black and carbon fiber; metal powder or metal fiber of copper, nickel, aluminum, silver, etc.; conductive whiskers of zinc oxide, potassium titanate etc.; conductive metal oxide such as titanium oxide; or a conductive polymer such as polyphenylene derivatives, and one of them or a mixture of two or more thereof may be used.

In addition, the positive electrode binder plays the role of improving attachment among positive electrode active material particles and bonding strength between the positive electrode active material and the positive electrode current collector. Particular examples may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), sulfonated EPDM, styrene-butadiene rubber (SBR), fluorine rubber, or various copolymers thereof, and one of them or a mixture of two or more thereof may be used.

Any separator used as a separator in a typical secondary battery may be used as long as it separates a negative electrode and a positive electrode and provides a passage for moving lithium ions. Particularly, a separator having low resistance against the moving of electrolyte ions and excellent wetting capacity of an electrolyte is preferable. Particularly, a porous polymer film manufactured using a polyolefin-based polymer, such as an ethylene homopolymer, a propylene homopolymer, an ethylene/butene copolymer, an ethylene/hexene copolymer, and an ethylene/methacrylate copolymer, may be used, or a stacked structure having two or more layers thereof may be used. Also, a typical porous nonwoven fabric, for example, a nonwoven fiber formed of high melting point glass fibers or polyethylene terephthalate fibers may be used. In addition, in order to secure heat resistance or mechanical strength, a coated separator including a ceramic component or a polymer material may be used, selectively in a single layer or multilayer structure.

The electrolyte may include an organic liquid electrolyte, an inorganic liquid electrolyte, a solid polymer electrolyte, a gel-type polymer electrolyte, a solid inorganic electrolyte, a fused-type inorganic electrolyte, which may be used for manufacturing a lithium secondary battery, without limitation.

Particularly, the electrolyte may include a nonaqueous organic solvent and a metal salt.

The nonaqueous organic solvent may use an aprotic organic solvent, for example, N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrogen furan, 2-methyl tetrahydrofuran, dimethyl sulfoxide, 1,3-dioxolan, formamide, dimethylformamide, dioxolan, acetonitrile, nitromethane, methyl formate, methyl acetate, phosphoric acid triester, trimethoxymethane, dioxolan derivatives, sulfolane, methyl sulfolane, 1,3-dimethyl-2-imidazolidinone, propylene carbonate derivatives, tetrahydrofuran derivatives, ether, methyl propionate, ethyl propionate, etc.

Particularly, ethylene carbonate and propylene carbonate, which are cyclic carbonates among the carbonate organic solvents, are organic solvents having high viscosity and high dielectric constant, and dissociate lithium salts in an electrolyte well, and may preferably be used. If such cyclic carbonate and a linear carbonate with low viscosity and low dielectric constant such as dimethyl carbonate and diethyl carbonate are mixed in an appropriate ratio and used, an electrolyte having high electroconductivity may be prepared and may more preferably be used.

The metal salt may use a lithium salt, and the lithium salt is a material which may be easily dissolved in the nonaqueous electrolyte. As the anions of the lithium salt, for example, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In the electrolyte, one or more kinds of additives, for example, a haloalkylene carbonate-based material such as difluoroethylene carbonate, pyridine, triethylphosphite, triethanolamine, cyclic ether, ethylenediamine, n-glyme, hexaphosphoric acid triamide, nitrobenzene derivatives, sulfur, a quinone imine dye, N-substituted oxazolidinone, N,N-substituted imidazolidine, ethylene glycol dialkyl ether, an ammonium salt, pyrrole, 2-methoxyethanol or aluminum trichloride, may be further included in addition to the constituent components of the electrolyte to improve life characteristics of a battery, to restrain the decrease of battery capacity, and to improve battery discharge capacity.

According to another embodiment of the present invention, there are provided a battery module including the lithium metal battery as a unit cell, and a battery pack including the same. The battery module and battery pack include the lithium metal battery having high capacity, and high rate determining performance and cycle properties, and may be used as a power of a medium and large sized device selected from the group consisting of an electric vehicle, a hybrid electric vehicle, a plug-in hybrid electric vehicle, and a power storage system.

Hereinafter, preferred embodiments will be suggested to assist the understanding of the present invention. It is apparent that the embodiments are, however, only illustrations of this disclosure and various changes and modifications may be made within the scope and technical spirit of the present disclosure, and such change and modification should be included in the attached claims.

EXAMPLES AND COMPARATIVE EXAMPLES

Comparative Example 1: Manufacture of Negative Electrode Current Collector

A commercial copper current collector (I2B, Iljin Materials) was prepared and cut to form a cylindrical negative electrode current collector having a cross-section diameter of 1.6 cm (16 $\phi$) and a thickness of 20 µm. The sum of S(110) and S(100) of copper at the surface of the negative electrode current collector was 35.6%.

Example 1: Manufacture of Negative Electrode Current Collector

The negative electrode current collector of Comparative Example 1 was put in a reactor, and the temperature of the reactor was increased to 1,000° C. At this temperature, heat treating was performed for 0.5 hours while inflowing a gas mixture composed of hydrogen and argon in an inflowing rate of 21 sccm into the reactor. Through this, a negative electrode current collector of Example 1 was manufactured. The hydrogen was included in 4 wt % based on the total amount of the gas mixture.

Experimental Example 1: Confirmation of S(100) and S(110)

Figure 2:
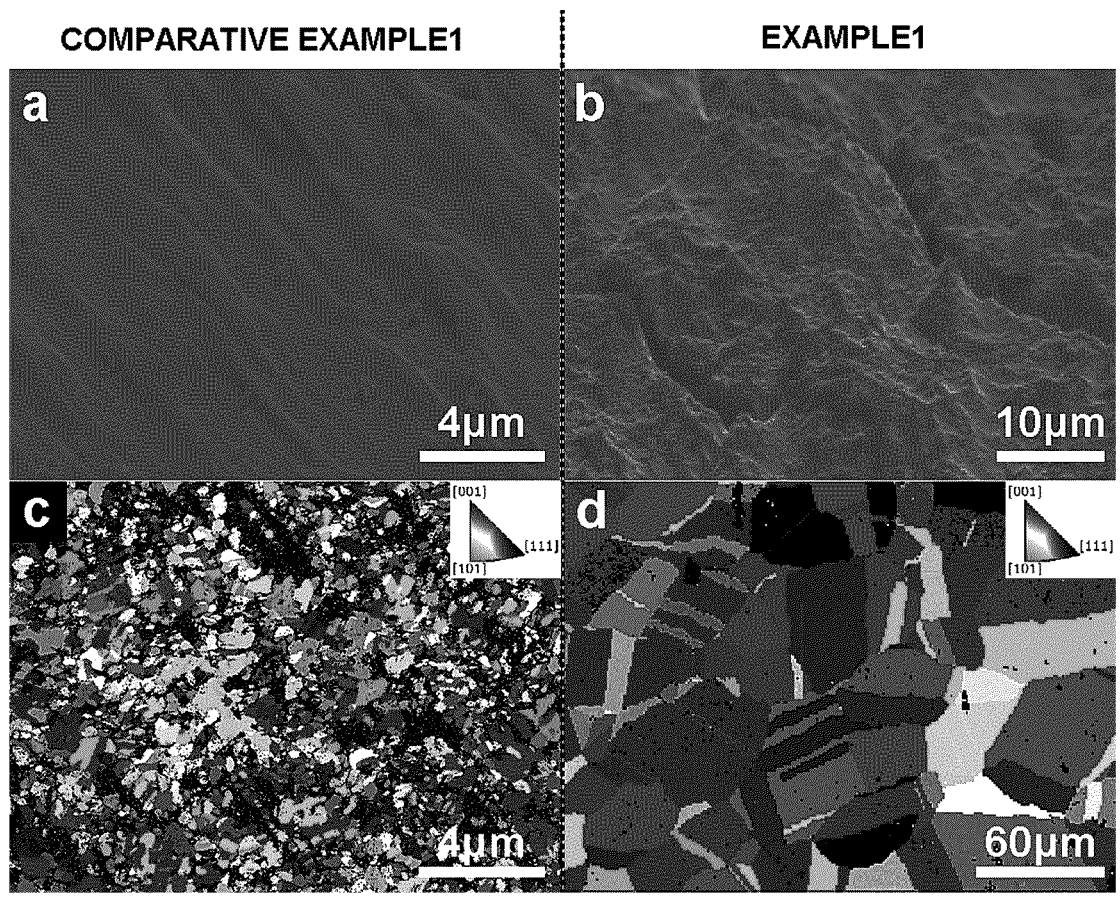
FIG. 2 shows a SEM photographic image of a negative electrode current collector (Comparative Example 1: a, and Example 1: b) and an EBSD photographic image of a negative electrode current collector (Comparative Example 1: c, and Example 1: d).

With respect to each of the negative electrode current collectors of Example 1 and Comparative Example 1, S(100) and S(110) were confirmed. Particularly, with respect to an optional part (180 µm×180 µm) at the surface of each negative electrode current collector, ratios occupied by a (100) surface and a (110) surface were confirmed using EBSD (Bruker QuantaxHigh Resolution equipped with a Zeiss Merlin field-emission scanning electron microscopy. 20 kV, 10 nA). Measurement was conducted in other parts by such a method, and S(100) and S(110) were calculated from averages of the total three results, and the results are shown in Table 1 and FIG. 2.

TABLE 1

|  | S(100) (%) | S(110) (%) | Sum of S(100) and S(110) (%) |
| --- | --- | --- | --- |
| Comparative Example 1 | 16.9 | 18.7 | 35.6 |
| Example 1 | 64.1 | 3.6 | 67.7 |

Referring to Table 1, it was confirmed that by performing the heat treatment of the present invention with respect to a commercial copper current collector, S(100) and S(110) were increased and the sum of S(100) and S(110) was 50% or more.

Experimental Example 2: Evaluation of Nuclei Density of Lithium, Initial Efficiency and Average Coulombic Efficiency In order to secure the performance of the negative electrode current collectors of Example 1 and Comparative Example 1, half cells were manufactured by the method explained below.

Each of the negative electrode current collectors of Example 1 and Comparative Example 1, was used as a positive electrode, and a lithium foil with a thickness of 150 µm was cut into 12 $\phi$ and used as a negative electrode. The negative electrode, the positive electrode and a porous polyethylene separator were assembled by a stacking method, and into an assembled battery, an electrolyte (1,3-dioxolane (DOL)/1,2-dimethoxyethane (DME)=1/1 (volume ratio) and lithium nitrate ($LiNO_3$ 0.2 mol)) was injected to manufacture a battery.

(1) Evaluation of Nuclei Density of Lithium

The batteries were driven in voltage sections of 0.05 V, 0.1 V, 0.2 V and 0.4 V for 15 seconds, respectively, to electrodeposit a lithium metal on the negative electrode current collector. Then, the nuclei density of the lithium metal formed on each negative electrode current collector was measured through a time-current method (chronoamperometry; CA) and Scharifker and Hills theory (SH theory) (see FIG. 6), and was shown in Table 2. In addition, each negative electrode current collector on which the lithium metal was electrodeposited was checked by SEM and shown in FIG. 5.

(2) Evaluation of Initial Efficiency and Average Coulombic Efficiency

Figure 7:
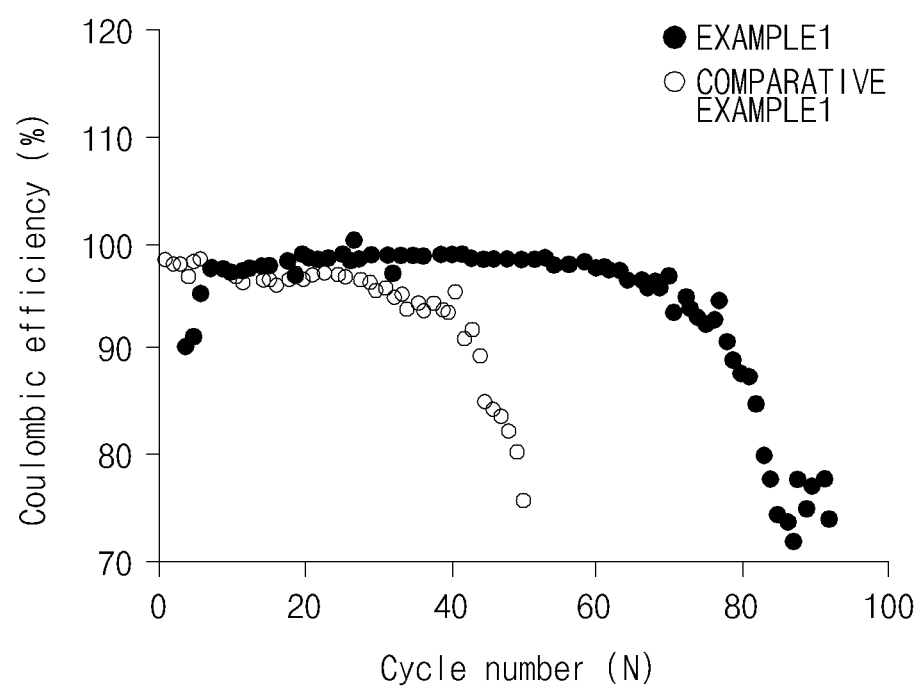
FIG. 7 is a graph showing coulombic efficiency in accordance with cycle for batteries including the negative electrode current collectors of Comparative Example 1 and Example 1, respectively.

With respect to each battery, charge and discharge were performed, and initial efficiency and average coulombic efficiency were evaluated and shown in Table 2 below and FIG. 7.

Meanwhile, in the first cycle, charge and discharge was performed with 0.1 C, and from the second cycle to 50th cycle, charging and discharging were performed with 1 C (based on a capacity of 1 $mAh/cm^2$).

Charge/discharge conditions: CC (constant current, 1 $mAh/cm^2$)/cut-off voltage (−1 V to 1 V vs $Li/Li^+$)

From the results of the first charge and discharge, initial efficiency (%) was derived. Particularly, the initial efficiency (%) was derived by the following calculation:

Initial efficiency (%)=(discharge capacity after first discharge/first charge capacity)×100

The average coulombic efficiency (%) was obtained, in from 11th cycle to 50th cycle, by adding (charge capacity/discharge capacity)×100 of each cycle and then dividing the sum by 40.

TABLE 2

|  | Nuclei density of lithium metal (N) | Initial efficiency (%) | Average coulombic efficiency (%) |
| --- | --- | --- | --- |
| Comparative Example 1 | $8.23 \times 10^{10}$ | 92.1 | 93.3 |
| Example 1 | $4.89 \times 10^{11}$ | 97.7 | 98.3 |

Figure 4:
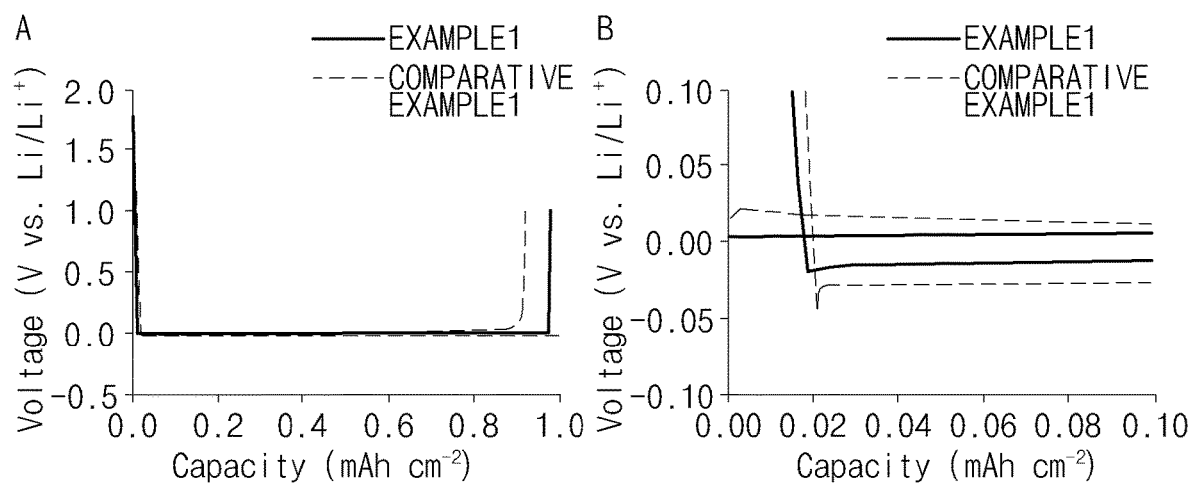
FIG. 4 are graphs showing voltage with respect to capacity of a battery in case where the batteries including the negative electrode current collector of Comparative Example 1 and Example 1, respectively, are driven at constant current.

Referring to Table 2, it was found that in a battery using the improved negative electrode current collector of the present invention (sum of S(110) and S(100) was 50% or more), the nuclei density of a lithium metal on the negative electrode current collector was increased. Accordingly, the lithium metal may be uniformly formed on the negative electrode current collector, and the formation of dendrite with a resin phase and a solid electrolyte interphase was minimized, and the initial efficiency and average coulombic efficiency of the battery were increased. In addition, referring to FIG. 4, it may be found that the absolute value of potential generating initial nucleation was relatively low for a case using the negative electrode current collector of Example 1 when compared with a case using the negative electrode current collector of Comparative Example 1. Accordingly, it may be found that lithium nuclei may be easily formed with a smaller amount of energy in Example 1.

Figure 5:
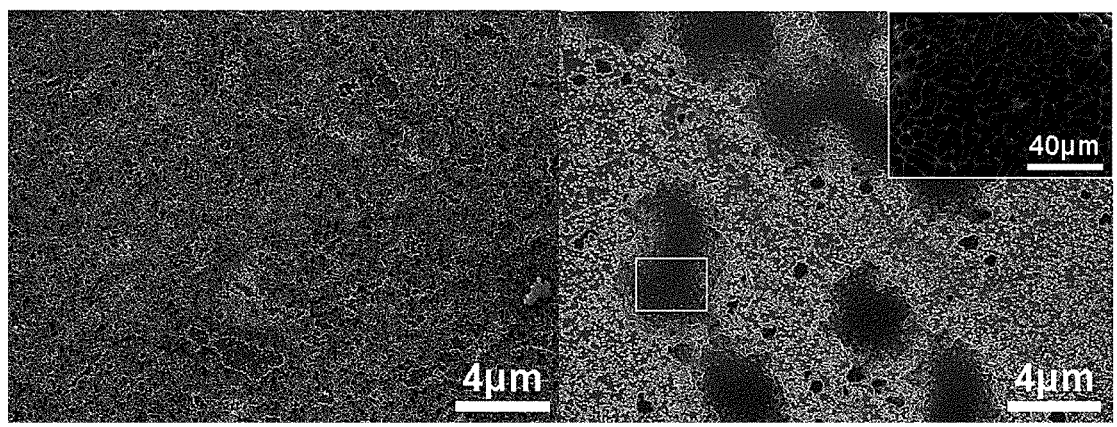
FIG. 5 shows SEM photographic images showing lithium shapes on negative electrode current collectors after driving batteries including the negative electrode current collectors of Comparative Example 1 and Example 1, respectively, with a specific voltage.
Figure 6:
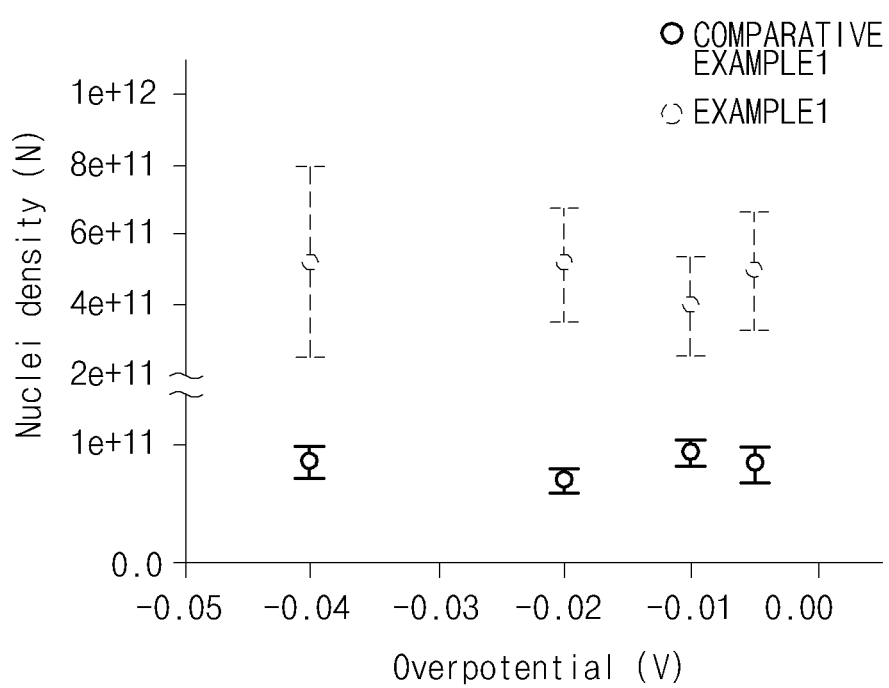
FIG. 6 shows data comparing nuclear density of lithium formed after driving batteries including the negative electrode current collectors of Comparative Example 1 and Example 1, respectively, at constant current.

In addition, referring to FIG. 5, it may be found that lithium is uniformly formed on the negative electrode current collector of Example 1 when compared with that of Comparative Example 1. That is, the nucleation was uniformly conducted and subsequently electrodeposited lithium also maintained uniformity.

Figure 3:
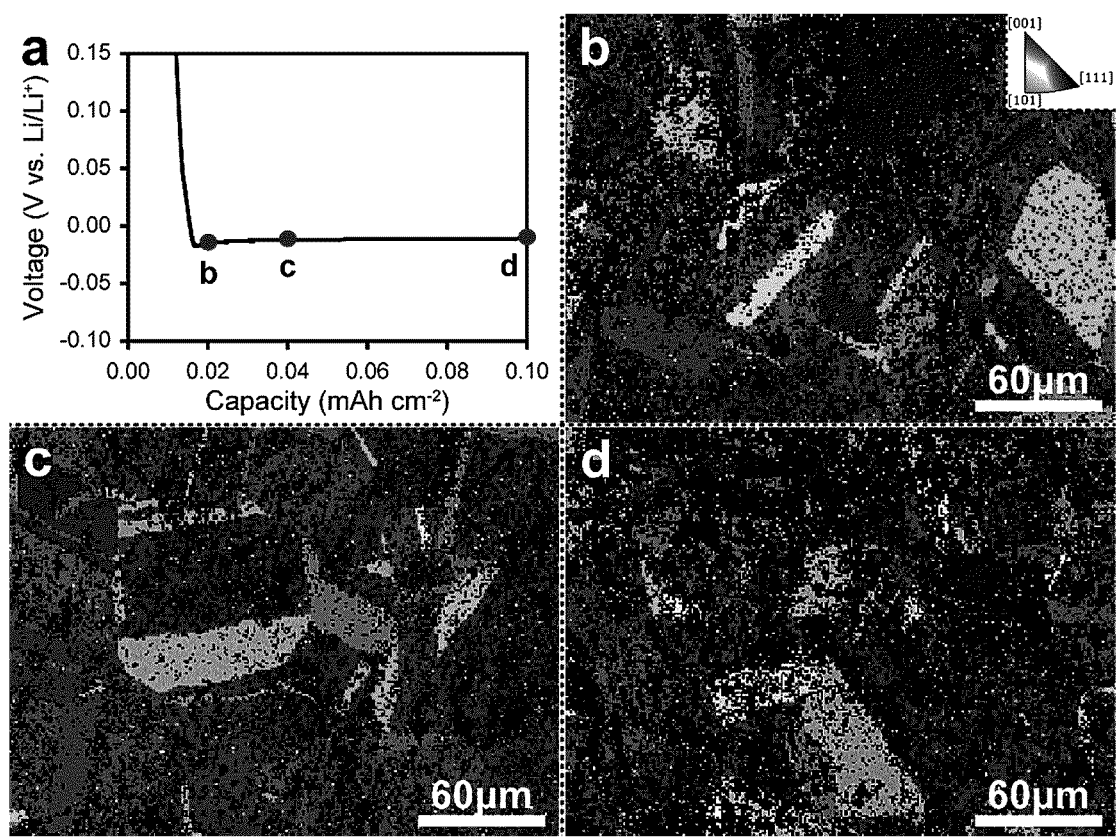
FIG. 3 shows EBSD photographic images (b, c and d) on the nucleation of lithium of a negative electrode current collector observed by time while driving a battery including the negative electrode current collector of Example 1 at constant current.

Meanwhile, FIG. 3 shows EBSD photographic images (b, c and d) on the nucleation of lithium of the negative electrode current collector observed by time while driving a battery including the negative electrode current collector of Example 1 at constant current. Referring to this, it may be confirmed that lithium is selectively plated first on a (100) surface (actually, red in b, c and d, but corresponding to the color similar to 001 in the chromaticity diagram on right upper end of b on the black and white drawing of PCT application) when compared with other crystal faces of copper. Through this, it may be found that electrochemical plating on the (100) surface of copper is more advantageous than other crystal surfaces.

The invention claimed is:

1. A negative electrode comprising:
a negative electrode current collector including a base and copper coated on the base,
wherein a thickness of the copper is from 10 nm to 500 nm,
wherein the negative electrode current collector is heat treated to remove a copper oxide layer on the surface of the negative electrode current collector; and
a lithium metal disposed on the negative electrode current collector;
wherein in said negative electrode current collector,
a sum of S(110) and S(100) is 50% or more,
wherein the S(110) is a ratio of a region occupied by a (110) surface of the copper based on an entire region occupied by the copper at a surface of the negative electrode current collector, and
the S(100) is a ratio of a region occupied by a (100) surface of the copper based on an entire region occupied by the copper at a surface of the negative electrode current collector.

2. The negative electrode according to claim 1, wherein the negative electrode current collector is made up of copper.

3. The negative electrode according to claim 1, wherein the base comprises at least one selected from the group consisting of silicon, silicon oxide, gold, stainless steel, aluminum, nickel, titanium and silver.

4. The negative electrode according to claim 1, wherein the ratio of the S(100) to the S(110) is 100:0 to 5:1.

5. The negative electrode according to claim 1, wherein the negative electrode is made up of the negative electrode current collector.

6. A lithium metal battery, comprising:
the negative electrode of claim 1;
a positive electrode;
a separator disposed between the positive electrode and the negative electrode; and
an electrolyte.

* * * * *